United States Patent Office 2,800,362
Patented July 23, 1957

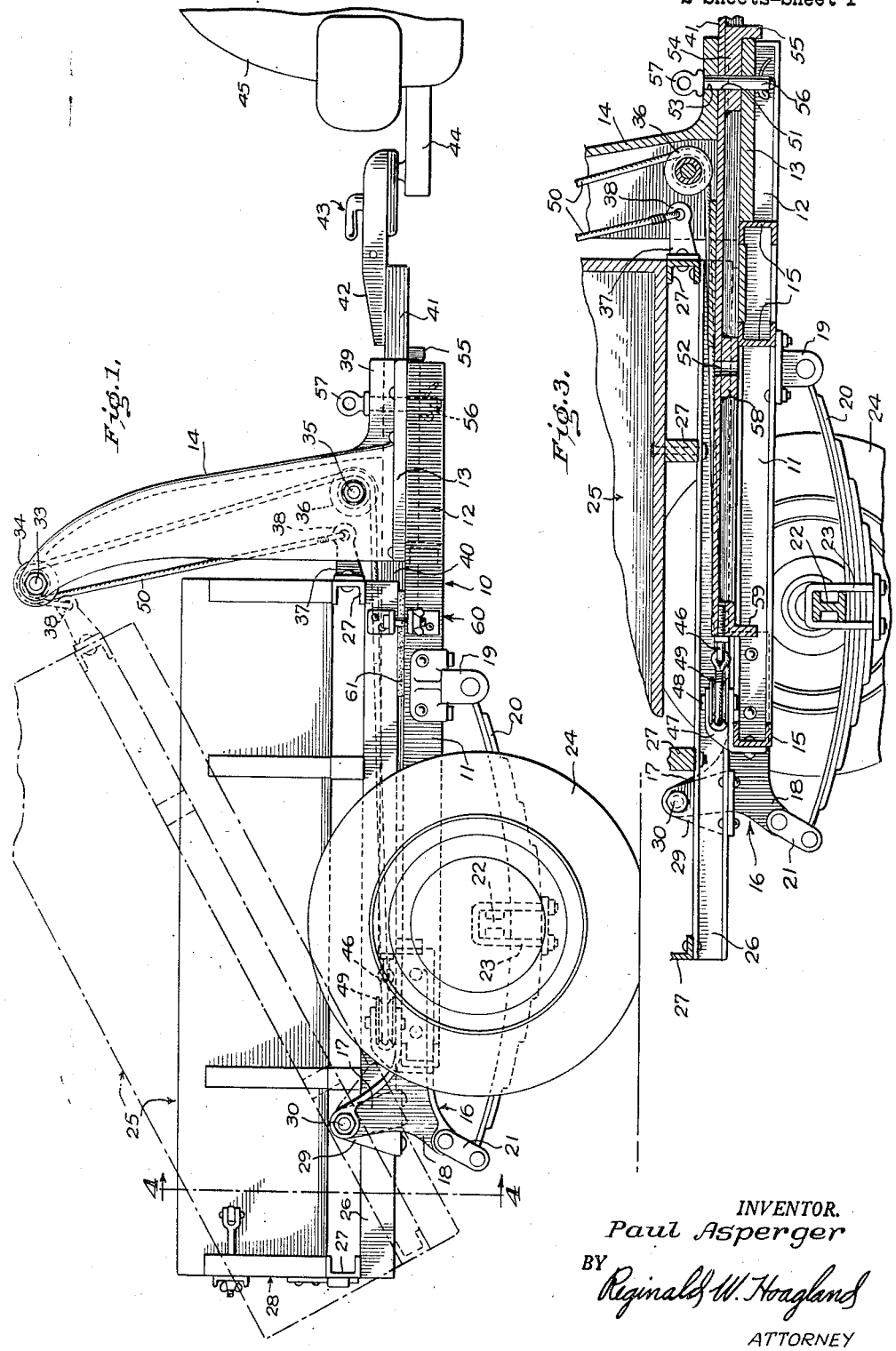

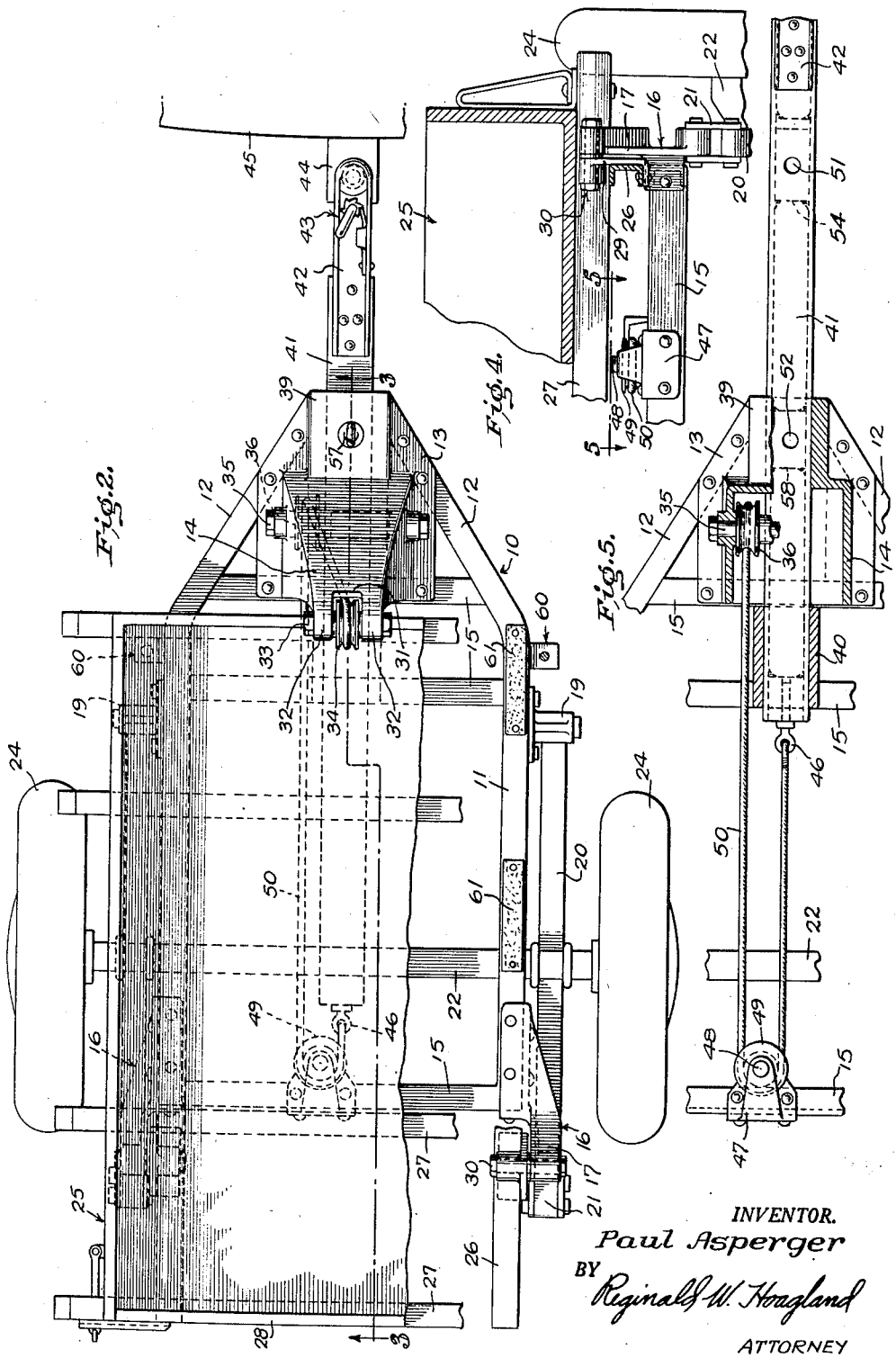

2,800,362

DUMPING TRAILER

Paul Asperger, Flint, Mich.

Application April 3, 1953, Serial No. 346,769

2 Claims. (Cl. 298—20)

The present invention relates to a dumping trailer and it consists in the combinations, constructions and arrangements of parts herein described and claimed.

Generally there is provided a trailer which is provided with a frame having a pair of supporting wheels and having pivotally mounted thereon adjacent the rear end thereof a trailer body. An upwardly and rearwardly extending mast is affixed to the forward end of the trailer frame and an elongated draw bar is centrally and longitudinally slidable in the frame and provided at its forward end with a trailer hitch whereby the same may be attached to a tractor vehicle. The forward end of the body is connected by means of a cable over a novel arrangement of pulleys with the rearward end of the draw bar. A pin is adapted to normally hold the draw bar against movement but, when withdrawn, and the supporting wheels of the trailer chocked in any suitable manner, the tractor vehicle may be utilized to draw the bar outwardly of the trailer frame whereby to lift the forward end of the trailer body and to dump the contents thereof rearwardly of the trailer. By a judicial use of the chocking devices, the contents of the body may be spread over a given area. The device contains many novel features which will be brought out in the annexed specification.

It is accordingly an object of the invention to provide a trailer having a dumping body mounted thereon and novel means for actuating said body.

Another object of the invention is to provide, in a device of the character set forth, a novel draw bar forming a part of the invention.

A further object of the invention is to provide, in a device of the character set forth, novel means for limiting the movement of a draw bar forming a part of the invention into and out of a trailer frame likewise forming a part of the invention.

Another object of the invention is the provision, in a device of the character set forth, of a novel mast, cable, and arrangement of pulleys, all forming parts of the invention.

Still a further object of the invention is to provide a device of the character set forth which is simple in construction, inexpensive to manufacture and yet effective and efficient in use.

Other and further objects of the invention will become apparent from a reading of the following specification taken in conjunction with the drawing, in which:

Figure 1 is a side elevational view of an embodiment of the invention,

Figure 2 is a plan view, partly broken away, of the device illustrated in Figure 1, Figure 3 is a fragmentary sectional view taken substantially along line 3—3 of Figure 2, Figure 4 is a fragmentary sectional view, somewhat enlarged, taken along line 4—4 of Figure 1, and Figure 5 is a fragmentary sectional view taken substantially along line 5—5 of Figure 4.

Referring more particularly to the drawings, there is shown therein a device of the character set forth comprising a trailer frame generally indicated at 10 and consisting of a pair of longitudinally extending spaced side bars 11 whose forward ends have integrally formed therewith inwardly and forwardly converging arms 12 to the upper side of the forward ends of which is bolted or otherwise affixed a base plate 13 of an upwardly and rearwardly extending hollow mast 14 the respective members 11 and 12 are interconnected by a plurality of cross bars 15 one of which also serves to support the plate 13.

A rearwardly and outwardly extending bracket generally indicated at 16 is mounted upon the rear end portion of each of the members 11 and each is provided with an upwardly and rearwardly extending arm 17 and a downwardly and rearwardly extending arm 18. Slightly forwardly of the center of each of the members 11 is affixed an outwardly extending bracket 19.

A pair of leaf springs 20 is provided and each is connected at its rearward end by a link 21 with the arm 18 of one of the brackets 16 and at its forward end with the bracket 19. An axle 22 is affixed centrally to the springs 20 by means of U-bolts 23 or the like and has mounted upon either end thereof a supporting wheel 24. A dump body is generally indicated at 25 and includes a body frame having side bars 26 and a plurality of interconnecting cross bars 27 together with a conventional tailgate 28.

Adjacent the rear end of each of the side bars 26 there is affixed an upwardly extending bracket 29 which is mounted upon the outer side of the bar 26 in each case and which, also in each case, is connected to the upwardly extending arm 17 of the bracket 16 by means of a pin 30 or the like, it being understood that the pins 30 together with the brackets which they interconnect are in transverse horizontal alignment.

The upper end of the mast 14 is bifurcated, as indicated at 31, thus providing a pair of upwardly extending legs 32 through which extends transversely a shaft 33 upon which is mounted a pulley 34. Transversely extending through the lower portion of the mast 14 is a shaft 35 upon which is mounted a pulley 36. Centrally mounted upon the foremost of the cross bars 27 is a forwardly extending bracket 37 terminating in an eye 38.

The base plate 13 is provided with a centrally disposed enlarged forwardly extending portion 39 and a like rearwardly extending portion 40. A draw bar 41 which is inverted U-shaped in cross sectional area is longitudinally slidable through the base 13 and particularly through the enlarged portions 39 and 40 and has a tongue 42 affixed to the upper face of the forward portion thereof which tongue extends forwardly and is provided with a pitch generally indicated at 43 whereby the same may be connected to the draw bar 44 of a tractor vehicle 45.

The rearward end of the draw bar 41 has affixed thereto a rearwardly extending eye 46. A bracket 47 is centrally affixed to one of the rearmost cross bars 27 and is provided with a vertically extending pin 48 upon which is mounted a pulley 49. A cable 50 is affixed at one of its ends to the eye 46 and extends thence rearwardly where it is entrained over the pulley 49 and thence extends forwardly to the pulley 36 over which it is then entrained and extends upwardly through the interior of the mast 14 where it extends over the pulley 34. It then extends downwardly where it is attached at its other end to the eye 38.

The draw bar 41 is provided with a forwardly positioned vertical opening 51 and with a rearwardly positioned vertical opening 52 and the extension 39 of the base 13 is centrally provided with an opening 53. A block 54 is welded or otherwise affixed within the draw bar 41 immediately below the opening 51 and is provided at its forward end with a dependent lug 55, it being seen by reference to Figure 3, for example, that the block 54 is provided with an extension of the opening 51. A pin 56 having a handle 57 at its upper end is adapted to be inserted through the opening 53 and, selectively, the openings 51 or 52. A block 58, provided with an extension of the opening 52 is affixed within the underside of the draw bar 41 immediately below the opening 52 and the extreme rear end of the draw bar 41 has integrally formed therewith a dependent lug 59. Suitable latches each generally indicated at 60, may be provided for locking the forward end of the body to the adjacent side members 11 when the body 25 is in its normal horizontal position shown in full lines in Figure 1. A plurality of pads 61 of resilient material is provided upon the upper sides of the members 11 for cushioning the body 25 when the latter is in its normal horizontal position.

In operation, it will be apparent that when the body 25 is loaded with material and in its normal horizontal position shown in Figure 1 in full lines and the device is hitched by means of the hitch member 43 to a tractor vehicle 45, that the same may be transported from place to place in normal manner. When, however, it is desired to dump the material contained in the body 25, it is only necessary to provide chocks (not shown) at the forward sides of the supporting wheels 24 and to thereupon open the tail gate 28 and remove the pin 56 from engagement through the openings 53 and 51 thus freeing the draw bar 41 so that when the tractor vehicle 45 is moved forwardly, the draw bar 41 will be moved outwardly of the trailer thus causing the cable 50 to be drawn forwardly at that end thereof which is attached to the rear end of the draw bar 41. This will cause the other end of the cable 50 to move upwardly toward the pulley 34 thus lifting the forward end of the body 25 upwardly and pivoting the body upon the pins 30 thus allowing the material contained in such body to drop by gravity from the rear end thereof. Should it be desirable to spread the material thus dropped, it is only necessary to remove the chocks from their positions in front of the wheels 24 thus allowing the trailer to move along with the tractor vehicle and thus spreading the material from the body 25 over a given area. It will also be apparent that the body 25 may be lowered gently to its normal position again atop the pads or cushions 61 by moving the tractor vehicle 45 slowly rearwardly thus permitting the body to reassume by gravity its original position after which it may be latched by means of the latching members 60.

It will also be apparent that the pin 56 may be inserted through the opening 52 and opening 53 when the draw bar 41 is in its forward position (and the body in its dumping position) to facilitate the spreading action above described and that, when the pin 56 is in its openings 53 and 51, the draw bar will be in its retracted position as shown, for example, in Figure 1. Likewise it will be seen that the dependent dogs 55 and 59 limit the rearward and forward movements of the draw bar 41.

While I have herein described a specific form which the invention may take, it will be understood that changes and modifications may be made by those skilled in the art which still fall within the spirit and scope of the appended claims.

What is claimed is:
1. A device of the character described comprising a wheeled trailer, a horizontal chassis frame for said trailer including a pair of longitudinally extending spaced side bars, a longitudinally reciprocable draw bar mounted on said frame and extending forwardly therefrom for attachment to a tractor vehicle, a dump body including a pair of longitudinally extending spaced side bars dependent from the underside thereof, an upwardly projecting bracket affixed to each side bar of said frame at the rear portion thereof and pivotally connected to a longitudinally extending side bar of said dump body, means operable by forward movement of said draw bar relative to said frame for lifting the forward end of said dump body by pivotal movement on its connection to said frame, each of said side bars on said frame being directly beneath and parallel to a side bar of said dump body for supporting the weight of said dump body substantially throughout the length thereof forwardly of its pivotal axis on the associated side bar of the frame when the forward end of the dump body is in its lowered position, and pressure-applying fastener means interconnecting the forward portions of the side bars of the body with the side bars of the frame so as to clamp said side bars of the body and frame against movement relative to each other when said body is in said lowered position.

2. A device of the character described comprising a wheeled trailer, a horizontal chassis frame for said trailer including a pair of longitudinally extending spaced side bars, a longitudinally reciprocable draw bar mounted on said frame and extending forwardly therefrom for attachment to a tractor vehicle, a dump body including a pair of longitudinally extending spaced side bars dependent from the underside thereof, an upwardly projecting bracket affixed to each side bar of said frame at the rear portion thereof and pivotally connected to a longitudinally extending side bar of said dump body, means operable by forward movement of said draw bar relative to said frame for lifting the forward end of said dump body by pivotal movement on its connection to said frame, each of said side bars on said frame being directly beneath and parallel to a side bar of said dump body for supporting the weight of said dump body substantially throughout the length thereof forwardly of its pivotal axis on the associated side bar of the frame when the forward end of the dump body is in its lowered position, and pressure-applying fastener means interconnecting the forward portions of the side bars of the body with the side bars of the frame so as to clamp said side bars of the body and frame against movement relative to each other when said body is in said lowered position, said brackets each affixed to the side bars of the frame having their upper portions laterally offset from said frame, said pivotal connection between the body and the frame comprising another support bracket affixed to each of said side bars of said body, and transversely extending pins hingedly interconnecting each support bracket of said body with each support bracket of said frame.

References Cited in the file of this patent

UNITED STATES PATENTS

| | | |
|---|---|---|
| 994,718 | Bushnell | June 13, 1911 |
| 1,038,796 | Snyder | Sept. 17, 1912 |
| 1,170,240 | Gary | Feb. 1, 1916 |
| 2,507,033 | Marquis | May 9, 1950 |
| 2,539,507 | Corning | Jan. 30, 1951 |
| 2,686,692 | Hunter et al. | Aug. 17, 1954 |